UNITED STATES PATENT OFFICE.

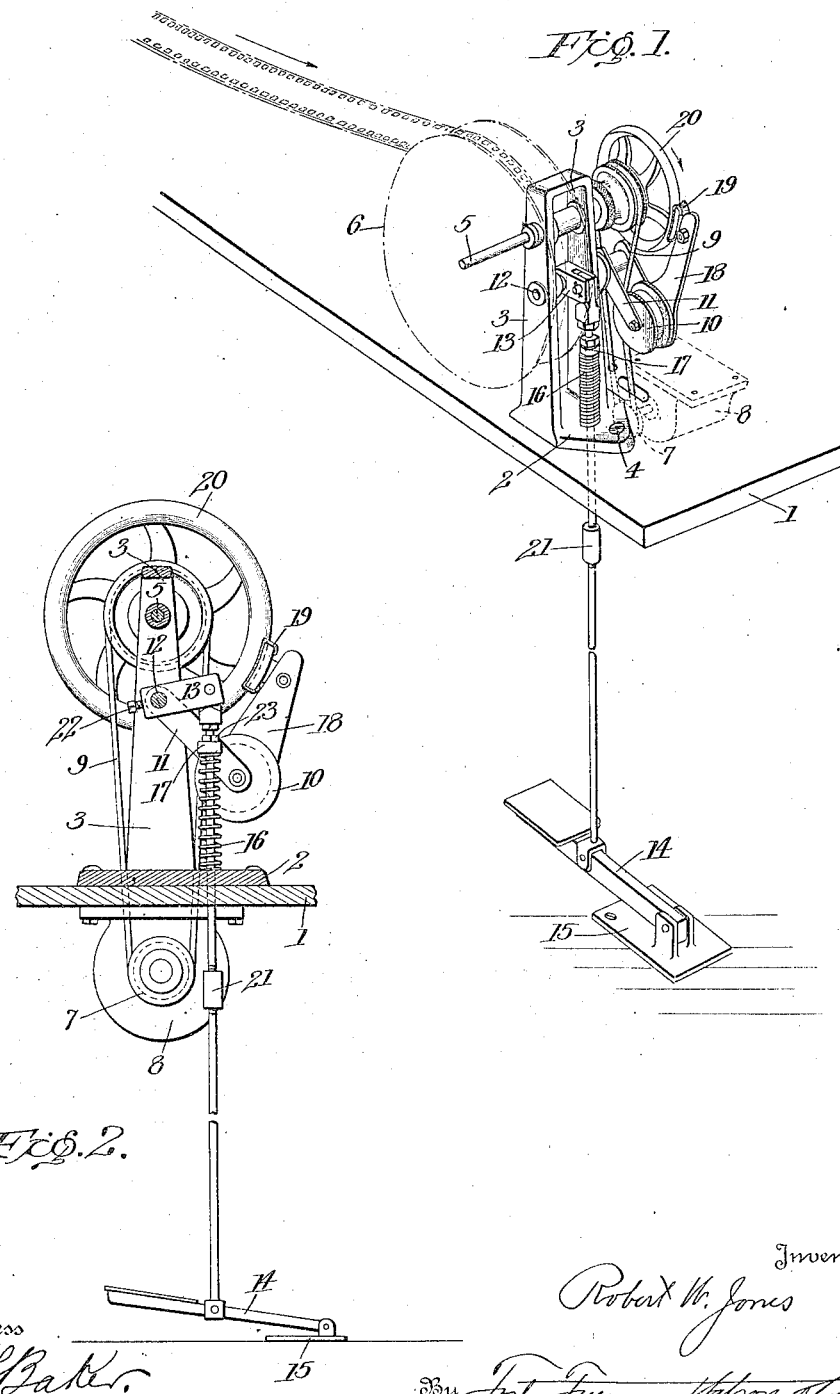

ROBERT W. JONES, OF WILKES-BARRE, PENNSYLVANIA, ASSIGNOR OF ONE-FOURTH TO LYMAN H. HOWE AND ONE-FOURTH TO STEWART M. WALKINSHAW, BOTH OF WILKES-BARRE, PENNSYLVANIA.

APPARATUS FOR WINDING MOTION-PICTURE FILMS.

1,301,849. Specification of Letters Patent. Patented Apr. 29, 1919.

Application filed November 29, 1916. Serial No. 134,154.

*To all whom it may concern:*

Be it known that I, ROBERT W. JONES, a citizen of the United States, residing at Wilkes-Barre, in the county of Luzerne and State of Pennsylvania, have invented a new and useful Improvement in Apparatus for Winding Motion-Picture Films, of which the following is a specification.

The present invention relates to improvements in winding machines and is particularly designed and adapted for use in winding or rewinding motion picture films.

In the manufacture of motion picture films it is customary to wind such films from one reel to another at various stages and under many conditions, for example during the development, washing and drying processes and while the operator or operators examine the film to discover possible imperfections therein. As the amount of labor required to manually rotate the reel upon which a film is being wound is considerable it has been proposed to drive the winding reel by suitable power devices as for example an electric motor. While the means heretofore employed for this purpose have been superior to the hand winding devices previously employed both in reducing the amount of manual work required and in permitting the operator or inspector to use both hands in discovering possible physical imperfections or defects in the film, for example broken feed apertures adjacent its side edges; such power actuated devices have not been free from objection. For example, during the winding operation the film may break and before the operator can cut off the current to the motor and check rotation of the winding reel, the film thereon, being relieved from the necessary tension, will become loose and be thrown about on the table, entailing much additional labor to untangle it and rewinding by hand preliminary to repairing the break. It is obvious that any attempt by the operator to suddenly stop the rapidly turning reel will be attended by great risk of injury to his hands; and if an imperfection is discovered rotation of the reel can not be stopped until the damaged or imperfect part has been wound thereon which necessitates a reverse movement of the reel or unwinding of the film to bring the damaged or imperfect section into position for repair or treatment. Therefore the power driven reels heretofore proposed have not been found suitable for inspection work in particular.

One of the objects of the present invention is to provide a readily and easily controllable film winding and rewinding device that eliminates the objections referred to and permits the operator or inspector to use both hands to discover imperfections or defects.

The object of the present invention is to provide a power driven winding means with devices whereby a winding shaft or reel may be instantaneously disconnected from a motor and its rotation stopped. A further object of the invention is to provide a device of this character which may be operated or controlled by movement of the operator's foot and the action of the several parts of which will be largely automatic requiring a minimum amount of attention or care when in use.

In the accompanying drawing Figure 1 is a perspective view of an embodiment of the invention. Fig. 2 is an elevation and partial section on a somewhat larger scale.

Referring to the drawing 1 designates the top of a suitable table or stand on which is mounted an upright frame comprising a base 2 and standards 3. The base 2 is rigidly secured to the table top by suitable means as for example screws 4 and constitutes the support for the other parts of the mechanism.

A shaft 5 mounted in suitable bearings in the frame standards 3 and projecting beyond said supporting frame at both ends is adapted to support a reel 6 indicated by dotted lines in Fig. 1, said shaft and reel being provided with any suitable means, not shown, by which the reel is held in position on the shaft so as to rotate therewith but permitting the reel to be readily detached when desired.

Power is communicated to the shaft 5 from a driving pulley 7, actuated by an electric motor 8 shown as secured to the under side of the table top 1, through a belt 9 which extends about a suitable pulley rigidly secured to the shaft. The driving belt or band 9 is of such length that normally, and except when actuated or tightened as hereinafter described, it permits the driving pulley 7 to rotate freely without imparting any rotation to the shaft 5. That is, the motor 8 may be continuously operated and the shaft 5 intermittingly connected therewith by a suitable belt tightening means to be hereinafter described and when such belt tightening means is in inoperative position, the shaft 5 and winding reel thereon may be held stationary.

As shown, one run or side of the driving belt 9 contacts with a pulley or peripherally grooved wheel 10 which is mounted to turn freely about a rod connecting a pair of arms 11 which are secured to a rock shaft 12 that is mounted in the uprights 3 below the winding shaft 5. Connected to said shaft 12 between the uprights 3 of the supporting frame is an arm 13 the free end of which is engaged with the upper member of a sectional rod or link the lower member of which is secured to a treadle or foot lever 14 that is fulcrumed on suitable lugs rising from a floor plate 15. The connecting rod or link extends through suitable alined apertures in the base plate 2 and table top 1, and about said rod or link above said base plate is arranged a coil spring 16. The spring 16 is confined between the base plate 2 and an abutment 17 in such manner that it acts to normally hold the parts in the position shown in Fig. 2 in which the belt tightening pulley or wheel 10 is inoperative to cause connection of the motor driven pulley 7 and the winding shaft 5.

To one of the arms 11 on the rockshaft 12 or to one end of the rod connecting said arms, on which the pulley 10 is mounted, is secured a brake carrying arm 18 which is provided adjacent its free end with a brake pad 19 adapted to coöperate with a brake wheel 20 rigidly secured on the winding shaft 5. Normally the brake is held against the brake wheel 20 by the action of the spring 16, the tension of which is such that the brake will positively prevent rotation of the winding shaft when in engagement with the wheel 20.

By depressing the treadle 14 the shaft 12 will be positively rocked and cause to simultaneously move the brake 19 downwardly and laterally away from the wheel 20 and carry the belt tightening pulley into the position shown in Fig. 1 whereby the belt 9 is caused to transmit movement from the motor 8 to the winding shaft. Such downward movement of the rock shaft acts to compress the spring 16 and the instant the treadle 14 is relieved from pressure said spring operates to shift the parts into the position shown in Fig. 2 in which the belt tightening pulley 10 is inoperative and the brake is applied to hold the winding shaft stationary.

The two sections of the rod or link between the treadle 14 and arm 13 on the rock shaft 12 are adjustably connected by a coupling 21 so that the operative length of said connection may be varied to regulate the extent of compression of the spring 16. It will be seen also that the arm 13 is adjustably mounted on the rock shaft 12, being secured in the desired position by a set screw 22. By these means the parts can be so adjusted that the brake pressure may be accurately regulated as desired. A lock nut 23 is provided for holding the abutment 17 in the desired position.

It is believed that the operation and advantages of the device will be readily appreciated from the foregoing description. It will be seen that when using it as a means for actuating and controlling movement of a rewinding reel for motion picture films, as shown in the drawing, the operator is not required to give any particular care or attention to the operation of starting or stopping the winding shaft. He is enabled to use both hands in examining the film and merely required to depress the treadle 14 to set the reel 6 in operation. If for any reason it is desired to discontinue the winding action a slight movement of the foot is only necessary to cause instant simultaneous disconnection of the winding shaft and motor and application of the brake. Actual experience with such a device as that herein illustrated has shown that it obviates the objections which have been found to exist with power actuating motion picture film winding devices such as heretofore employed. It will be seen that the movement of the brake toward inactive position is in the direction of rotation of the winding shaft and that the power or pull employed to release the brake and connect the motor and winding shaft is exerted in a straight downward direction. As before noted while the device is particularly adapted for use in connection with motion picture films it may be advantageously used in connection with winding or reeling other articles or materials.

Having thus described the invention, what is claimed is:

1. A machine of the class described including in combination, a frame, a reel shaft rotatably supported thereon, a brake wheel secured to the shaft, a drive shaft disposed below said frame, normally inoperative driving means connecting said drive and reel shafts, a rock shaft on the frame and having an arm, a brake shoe carried by said arm to coöperate with said wheel, means connected to said arm between the shaft and said shoe to control said driving means, manually operable means to turn the rock shaft in the direction to release the brake shoe and render the driving means operative including a second arm secured on the rock shaft for angular adjustment, a pedal, and a rod connecting the pedal and second arm; and a spring operative on said second arm to turn the rock shaft in the opposite direction to thereby apply the brake and render the driving means inoperative.

2. A machine of the class described including in combination, a frame, a reel shaft rotatably supported thereon, a brake wheel secured to the shaft, a drive shaft disposed below said frame, a normally loose belt connecting the drive and reel shafts, a rock shaft on the frame having an arm, a belt tightener pulley and brake shoe carried by said arm, said shoe adapted to coöperate with said wheel, manually operable means to turn the rock shaft in the direction to release the brake shoe and move the pulley to tighten the belt including a second arm on the rock shaft, a pedal, and a rod connecting the pedal and second arm; and a spring interposed between the second arm and frame to turn the rock shaft in the opposite direction to thereby apply the brake and move the pulley to loosen the belt.

3. A machine of the class described including in combination a frame, a reel shaft rotatably supported thereon, a brake wheel secured to the shaft, a drive shaft, normally inoperative driving means connecting said drive and reel shafts, a rock shaft on the frame, an arm secured to said rock shaft, a brake shoe carried by said arm to coöperate with said wheel, means connected to said arm on the same side of the rock shaft as said shoe to control said driving means, manually operable means to turn the rock shaft in the direction to release the brake shoe and render the driving means operative including a second arm secured to the rock shaft, a pedal, a rod connecting the pedal and second arm, and a spring operative to turn the rock shaft in the opposite direction to thereby apply the brake and render the driving means inoperative.

In testimony whereof I affix my signature.

ROBERT W. JONES.

Copies of this patent may be obtained for five cents each, by addressing the "Commissioner of Patents, Washington, D. C."